United States Patent
Messmer et al.

(10) Patent No.: US 12,363,326 B2
(45) Date of Patent: *Jul. 15, 2025

(54) SCALABLE SYSTEMS FOR CONTROLLING COLOR MANAGEMENT COMPRISING VARYING LEVELS OF METADATA

(71) Applicant: DOLBY LABORATORIES LICENSING CORPORATION, San Francisco, CA (US)

(72) Inventors: Neil W. Messmer, Langley (CA); Robin Atkins, Campbell, CA (US); Steve Margerm, New Westminister (CA); Peter W. Longhurst, Vancouver (CA)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/049,625

(22) Filed: Feb. 10, 2025

(65) Prior Publication Data

US 2025/0184506 A1    Jun. 5, 2025

Related U.S. Application Data

(63) Continuation of application No. 18/957,187, filed on Nov. 22, 2024, which is a continuation of application
(Continued)

(51) Int. Cl.
*H04N 19/30* (2014.01)
*G06F 3/14* (2006.01)
(Continued)

(52) U.S. Cl.
CPC ............... *H04N 19/30* (2014.11); *G06T 9/00* (2013.01); *G09G 5/02* (2013.01); *H04N 1/603* (2013.01);
(Continued)

(58) Field of Classification Search
CPC ...... H04N 1/603; H04N 19/30; H04N 21/235; H04N 21/440227; H04N 9/69; G06T 9/00; G06F 3/1454; G09G 5/02
See application file for complete search history.

(56) References Cited

U.S. PATENT DOCUMENTS

| | | |
|---|---|---|
| 5,276,779 A | 1/1994 | Staff |
| 6,075,888 A | 6/2000 | Schwartz |

(Continued)

FOREIGN PATENT DOCUMENTS

| | | |
|---|---|---|
| CN | 1467655 A | 1/2004 |
| CN | 101025764 A | 8/2007 |

(Continued)

OTHER PUBLICATIONS

Adobe Photoshop, "Adobe Photoshop 5.0 Limited Edition, Chapter 4: Making Color and Tonal Adjustments," Jan. 1, 1998, pp. 67-89.
(Continued)

*Primary Examiner* — Sing-Wai Wu

(57) ABSTRACT

Several embodiments of scalable image processing systems and methods are disclosed herein whereby color management processing of source image data to be displayed on a target display is changed according to varying levels of metadata.

3 Claims, 10 Drawing Sheets

Related U.S. Application Data

No. 18/731,860, filed on Jun. 3, 2024, which is a continuation of application No. 18/413,720, filed on Jan. 16, 2024, now Pat. No. 12,231,660, which is a continuation of application No. 18/219,344, filed on Jul. 7, 2023, now Pat. No. 11,917,171, which is a continuation of application No. 17/353,519, filed on Jun. 21, 2021, now Pat. No. 11,736,703, which is a continuation of application No. 14/740,862, filed on Jun. 16, 2015, now Pat. No. 11,218,709, which is a continuation of application No. 14/003,097, filed as application No. PCT/US2012/038448 on May 17, 2012, now Pat. No. 9,111,330.

(60) Provisional application No. 61/491,014, filed on May 27, 2011.

(51) Int. Cl.
*G06T 9/00* (2006.01)
*G09G 5/02* (2006.01)
*H04N 1/60* (2006.01)
*H04N 9/69* (2023.01)
*H04N 21/235* (2011.01)
*H04N 21/4402* (2011.01)

(52) U.S. Cl.
CPC ............ *H04N 9/69* (2013.01); *H04N 21/235* (2013.01); *H04N 21/440227* (2013.01); *G06F 3/1454* (2013.01)

(56) References Cited

U.S. PATENT DOCUMENTS

| | | | |
|---|---|---|---|
| 6,335,983 B1 | 1/2002 | McCarthy et al. |
| 6,529,212 B2 | 3/2003 | Miller |
| 6,757,010 B2 | 6/2004 | Faciano |
| 6,844,881 B1 | 1/2005 | Chek |
| 6,989,859 B2 | 1/2006 | Parulski |
| 7,158,673 B2 | 1/2007 | Nakabayashi |
| 7,206,791 B2 | 4/2007 | Hind et al. |
| 7,289,663 B2 | 10/2007 | Spaulding |
| 7,492,375 B2 | 2/2009 | Toyama |
| 7,599,551 B2 | 10/2009 | Takahashi |
| 7,616,233 B2 | 11/2009 | Steinberg et al. |
| 7,746,411 B1 | 6/2010 | Balram |
| 7,809,200 B2 | 10/2010 | Aguilar |
| 7,844,140 B2 | 11/2010 | Fujita |
| 8,483,479 B2 | 7/2013 | Kunkel |
| 8,525,933 B2 | 9/2013 | Atkins |
| 8,537,893 B2 | 9/2013 | Efremov |
| 8,593,480 B1 | 11/2013 | Ballestad |
| 8,611,421 B1 | 12/2013 | Efremov |
| 8,831,343 B2 | 9/2014 | Kunkel |
| 8,837,825 B2 | 9/2014 | Su |
| 8,989,267 B2 | 3/2015 | Efremov |
| 9,014,533 B2 | 4/2015 | Doser |
| 9,111,330 B2 | 8/2015 | Messmer et al. |
| 10,057,633 B2 | 8/2018 | Oh et al. |
| 11,218,709 B2 | 1/2022 | Messmer et al. |
| 11,736,703 B2 | 8/2023 | Messmer et al. |
| 11,917,171 B2 | 2/2024 | Messmer et al. |
| 12,081,778 B2 | 9/2024 | Messmer et al. |
| 12,231,660 B2 | 2/2025 | Messmer et al. |
| 2001/0050757 A1 | 12/2001 | Yoshida |
| 2002/0024529 A1 | 2/2002 | Miller |
| 2002/0041287 A1 | 4/2002 | Engeldrum |
| 2002/0075136 A1 | 6/2002 | Nakaji |
| 2002/0080245 A1 | 6/2002 | Parulski |
| 2003/0095197 A1 | 5/2003 | Wheeler et al. |
| 2004/0057061 A1 | 3/2004 | Bochkarev |
| 2004/0183813 A1 | 9/2004 | Edge |
| 2005/0050043 A1 | 3/2005 | Phhalammi |
| 2005/0123267 A1 | 6/2005 | Tsumagari et al. |
| 2006/0020624 A1 | 1/2006 | Svendsen |
| 2006/0203107 A1 | 9/2006 | Steinberg et al. |
| 2006/0263758 A1 | 11/2006 | Crutchfield |
| 2006/0288400 A1 | 12/2006 | Weston et al. |
| 2006/0294125 A1 | 12/2006 | Deavem |
| 2007/0046826 A1 | 3/2007 | Bellis, II et al. |
| 2007/0065005 A1 | 3/2007 | Cha |
| 2007/0080974 A1 | 4/2007 | Edge |
| 2007/0127093 A1 | 6/2007 | Kuno |
| 2007/0262985 A1 | 11/2007 | Watanabe et al. |
| 2007/0268411 A1 | 11/2007 | Rehm |
| 2008/0080767 A1 | 4/2008 | Cho |
| 2008/0088857 A1 | 4/2008 | Zimmer |
| 2008/0094515 A1 | 4/2008 | Gutta |
| 2008/0170031 A1 | 7/2008 | Kuo |
| 2008/0186413 A1 | 8/2008 | Someya et al. |
| 2008/0186707 A1 | 8/2008 | Ku |
| 2008/0225180 A1 | 9/2008 | Callway |
| 2008/0297815 A1 | 12/2008 | Dalrymple |
| 2009/0002561 A1 | 1/2009 | Barnhoefer |
| 2009/0027558 A1 | 1/2009 | Mantiuk |
| 2009/0092325 A1 | 4/2009 | Brown |
| 2009/0115901 A1 | 5/2009 | Winter |
| 2009/0161017 A1 | 6/2009 | Glen |
| 2009/0174726 A1 | 7/2009 | Ollivier |
| 2009/0201309 A1 | 8/2009 | Demos |
| 2009/0267876 A1 | 10/2009 | Kerofsky |
| 2009/0284554 A1 | 11/2009 | Doser |
| 2010/0007599 A1 | 1/2010 | Kerofsky |
| 2010/0008427 A1 | 1/2010 | Chiu |
| 2010/0020242 A1 | 1/2010 | Lammers |
| 2010/0073362 A1 | 3/2010 | Ikizyan |
| 2010/0073390 A1 | 3/2010 | Myers |
| 2010/0118008 A1 | 5/2010 | Matsuoka |
| 2010/0128057 A1 | 5/2010 | Doser |
| 2010/0149207 A1 | 6/2010 | Madden |
| 2010/0150457 A1 | 6/2010 | Angell |
| 2010/0158099 A1 | 6/2010 | Kalva et al. |
| 2010/0172411 A1 | 7/2010 | Efremov |
| 2010/0183071 A1 | 7/2010 | Segall |
| 2010/0195901 A1 | 8/2010 | Andraus |
| 2010/0220237 A1 | 9/2010 | Doser et al. |
| 2010/0226547 A1 | 9/2010 | Criminisi |
| 2010/0231935 A1 | 9/2010 | Takenaka |
| 2010/0289810 A1 | 11/2010 | Doser |
| 2010/0289812 A1 | 11/2010 | Kobayashi |
| 2010/0329646 A1 | 12/2010 | Loeffler |
| 2011/0026824 A1 | 2/2011 | Ishll |
| 2011/0064373 A1 | 3/2011 | Doser et al. |
| 2011/0216162 A1 | 9/2011 | Filippini et al. |
| 2012/0054664 A1 | 3/2012 | Dougall et al. |
| 2012/0066640 A1 | 3/2012 | Kwak |
| 2012/0321273 A1 | 12/2012 | Messmer et al. |
| 2013/0076763 A1 | 3/2013 | Messmer |
| 2013/0322532 A1 | 12/2013 | Efremov |
| 2014/0002478 A1 | 1/2014 | Ballestad |
| 2014/0078165 A1 | 3/2014 | Messmer et al. |
| 2014/0086321 A1 | 3/2014 | Efremov |
| 2014/0092004 A1 | 4/2014 | Mishra et al. |
| 2015/0156506 A1 | 6/2015 | Efremov |
| 2018/0262767 A1 | 9/2018 | Messmer et al. |
| 2019/0289305 A1 | 9/2019 | Messmer et al. |
| 2022/0086467 A1 | 3/2022 | Messmer et al. |
| 2023/0353762 A1 | 11/2023 | Messmer et al. |
| 2024/0155143 A1 | 5/2024 | Messmer et al. |
| 2024/0155144 A1 | 5/2024 | Messmer et al. |
| 2024/0323413 A1 | 9/2024 | Messmer et al. |
| 2024/0323414 A1 | 9/2024 | Messmer et al. |

FOREIGN PATENT DOCUMENTS

| | | |
|---|---|---|
| CN | 101031972 A | 9/2007 |
| CN | 101049009 A | 10/2007 |
| CN | 101523888 A | 9/2009 |
| CN | 101582977 A | 11/2009 |
| CN | 101600049 A | 12/2009 |
| CN | 101641949 A | 2/2010 |
| CN | 101933094 A | 12/2010 |
| GB | 2408872 A | 6/2005 |

(56) References Cited

FOREIGN PATENT DOCUMENTS

| | | |
|---|---|---|
| JP | 63-061591 | 3/1988 |
| JP | H08153197 A | 6/1996 |
| JP | H09149275 A | 6/1997 |
| JP | 1998-294853 | 11/1998 |
| JP | H11355798 A | 12/1999 |
| JP | 2001-251640 A | 9/2001 |
| JP | 2002-027266 A | 1/2002 |
| JP | 2002-092655 A | 3/2002 |
| JP | 2003-052050 A | 2/2003 |
| JP | 2003-248467 A | 9/2003 |
| JP | 2004-282599 A | 10/2004 |
| JP | 2005-210526 A | 8/2005 |
| JP | 2006-042294 A | 2/2006 |
| JP | 2006-145577 A | 6/2006 |
| JP | 2006-343957 A | 12/2006 |
| JP | 2007-067559 A | 3/2007 |
| JP | 2007-251891 A | 9/2007 |
| JP | 2007-318256 A | 12/2007 |
| JP | 2007-325134 A | 12/2007 |
| JP | 2007-336531 A | 12/2007 |
| JP | 2008-515349 A | 5/2008 |
| JP | 2008-519497 A | 6/2008 |
| JP | 4150490 B2 | 9/2008 |
| JP | 2009-017200 A | 1/2009 |
| JP | 2009-524371 A | 6/2009 |
| JP | 2010-524025 A | 7/2010 |
| JP | 2010-239498 A | 10/2010 |
| JP | 2011-091753 A | 5/2011 |
| JP | 2012-526451 A | 10/2012 |
| JP | 2016-522588 A | 7/2016 |
| JP | 2021-104767 A | 7/2021 |
| KR | 10-2007-0054066 A | 5/2007 |
| KR | 10-2008-0107389 A | 12/2008 |
| KR | 10-2009-0009832 A | 1/2009 |
| KR | 10-2009-0017029 A | 2/2009 |
| KR | 10-2007-0111391 A | 5/2009 |
| KR | 10-2010-0074016 A | 7/2010 |
| KR | 10-2010-0093112 A | 8/2010 |
| KR | 10-2010-0081886 A | 3/2011 |
| KR | 10-2011-0028403 A | 3/2011 |
| KR | 10-2011-0043775 A | 6/2011 |
| WO | WO 2005/013087 A2 | 2/2005 |
| WO | WO 2007/142624 A1 | 12/2007 |
| WO | WO 2008/095037 A2 | 8/2008 |
| WO | WO 2009/095732 A1 | 8/2009 |
| WO | WO 2010/021705 A1 | 2/2010 |
| WO | WO 2010/024782 A1 | 3/2010 |
| WO | WO 2010/104624 A2 | 9/2010 |
| WO | WO 2010/128962 A1 | 11/2010 |
| WO | WO 2012/118961 A1 | 9/2012 |
| WO | WO 2012/125802 A1 | 9/2012 |
| WO | WO 2012/166382 A2 | 12/2012 |

OTHER PUBLICATIONS

Cadik et al., "Evaluation of HDR Tone Mapping Methods Using Essential Perceptual Attributes," Computers and Graphics 32, 2008, 330-349.
Chou and Chang, "Color Calibration of Recovering High Dynamic Range Images," International Conference on Computer Science and Software Engineering, CSSE 2008, v. 6, pp. 286-289.
Drago et al., "Adaptive Logarithmic Mapping for Displaying High Contrast Scenes," Eurographics, vol. 22 (2003) No. 3, 9 pages.
Extended European Search Report and Written Opinion in European Appln. No. 21216250.7, mailed on May 9, 2022, 7 pages.
Extended European Search Report issued in EP12792811.7, mailed on Sep. 4, 2015, 5 pages.
Extended European Search Report issued in European Application No. 19190529.8, mailed on Dec. 3, 2019, 13 pages.
Farbman et al., "Edge-Preserving Decompositions for Multi-Scale Tone and Detail Manipulation," ACM Transactions on Graphics, Aug. 11, 2008, 27(3):1-10.
Gatta et al., "Perceptually Inspired HDR Images Tone Mapping with Color Correction," International Journal of Imaging Systems and Technology, 2007, 17(5):285-294 (Abstract Only).
Green et al., "How Scalable are Gamut Mapping Algorithms?" Proc. SPIE 5293, Color Imaging IX: Processing, Hardcopy, and Applications, San Jose, CA. Jan. 18, 2004.
International Preliminary Report on Patentability issued in PCT/US2012/038448, mailed on Dec. 2, 2013, 4 pages.
International Search Report issued in PCT/US2012/038448, mailed on Jan. 2, 2013, 3 pages.
Kang et al., "High Dynamic Range Video" SIGGRAPH ACM, 2003, pp. 319-325.
Lee et al., "Dynamic Range Compression Algorithm for Mobile Display Devices Using Average Luminance Values," ISIC-2009, 12th International Symposium on Integrated Circuits Proceedings, Dec. 14, 2009, pp. 340-343.
Li et al., "Algorithm for Visualization of High Dynamic Range Images," Application Research of Computers, Nov. 2007, 24(11):303-5 (Abstract Only).
Mantiuk et al. "A Perceptual Framework for Contrast Processing of High Dynamic Range Images," ACM Trans. Appl. Percept. vol. 3, No. 3, 2006, 9 pages.
Mantiuk et al., "Display Adaptive Tone Mapping," SIGGRAPH 2008 ACM papers, pp. 1-10.
Mantiuk et al., "High Dynamic Range Image and Video Compression—Fidelity Matching Human Visual Performance," Source: Proc. 2007 IEEE International Conference on Image Processing, 4 pages.
Pattanaik et al., "Adaptive Gain Control for High Dynamic Range Image Display," Proc. of the 18th Spring Conference on Computer Graphics, 2002, pp. 83-87.
Pouli et al. "Progressive Histogram Reshaping for Creative Color Transfer and Tone Reproduction," Proc. of the 8th International Symposium on Non-Photorealistic Animation and Rendering, 2010, pp. 81-90, published by ACM.
Raffin et al., "Tone Mapping and Enhancement of High Dynamic Range Images Based on a Model of Visual Perception," Proc. of the Tenth IASTED International Conference on Computer Graphics and Imaging, 2008, pp. 190-195 (Abstract Only).
Reinhard et al., "Color Imaging," SIGGRAPH ACM, 2009, pp. 1-239.
Reinhard et al., "Photographic Tone Reproduction for Digital Images," ACM Transactions on Graphics, Jul. 2002, Proc. of SIGGRAPH 2002, pp. 267-276.
Rempel et al., "Video Viewing Preferences for HDR Displays Under Varying Ambient Illumination," Proc. of the 6th Symposium on Applied Perception in Graphics and Visualization, 2009, pp. 45-52.
Shaw, "Color Correction, Enhancement and Creativity: Advancing the Craft," Oct. 2005, 6 pages.
Smith et al., "Beyond Tone Mapping: Enhanced Depiction of Tone Mapped HDR Images," vol. 25, 2006, No. 3, 12 pages.
Stauder et al., "Gamut ID," 1ET 4th European Conference on Visual Media Production (CVMP 2007), Jan. 2007, p. 22.
Tamburrino et al., "Digital Camera Workflow for High Dynamic Range Images Using a Model of Retinal Processing," Proc. of SPIE—The International Society for Optical Engineering, v. 6817, 2008 (Abstract Only).
Wang et al., "Retinex-Based Color Correction for Displaying High Dynamic Range Images," International Conference on Signal Processing Proceedings, 2010 10th International Conference, pp. 1021-1024.
Ward and Simmons, "JPEG-HDR: A Backwards-Compatible, High Dynamic Range Extension to JPEG," Submitted to 13th Color Imaging Conference, Nov. 2005, 8 pages.
Ward et al., "High Dynamic Range Imaging & Image-Based Lighting," SIGGRAPH 2008 ACM, pp. 1-137.
Wei et al., "Performance Evaluation of Color Correction Approaches for Automatic Multi-View Image and Video Stitching," Computer Vision and Pattern Recognition, 2010 IEEE Conference, 8 pages.
Written Opinion of the International Searching Authority issued in PCT/US2012/038448, mailed on Dec. 28, 2012, 3 pages.
Zhang et al. "An Adaptive Tone Mapping Algorithm for High Dynamic Range Images," Computational Color Imaging: Second International Workshop, Mar. 26-27, 2009, pp. 207-215.

SCALABLE SYSTEMS FOR CONTROLLING COLOR MANAGEMENT COMPRISING VARYING LEVELS OF METADATA

CROSS-REFERENCE TO RELATED APPLICATIONS

This application is a continuation of U.S. patent application Ser. No. 18/957,187, filed Nov. 22, 2024, which is a continuation of U.S. patent application Ser. No. 18/731,860, filed Jun. 3, 2024, which is a continuation of U.S. patent application Ser. No. 18/413,720, filed Jan. 16, 2024, which is a continuation of U.S. patent application Ser. No. 18/219,344, filed Jul. 7, 2023, now U.S. Pat. No. 11,917,171, which is a continuation of U.S. patent application Ser. No. 17/353,519, filed Jun. 21, 2021, now U.S. Pat. No. 11,736,703, which is a continuation of U.S. patent application Ser. No. 14/740,862, filed on Jun. 16, 2015, now U.S. Pat. No. 11,218,709, which is a continuation of U.S. patent application Ser. No. 14/003,097, filed Sep. 4, 2013, now U.S. Pat. No. 9,111,330, which is a Section 371 National Stage Application of International Application No. PCT/US2012/038448, filed May 17, 2012, which claims priority to United States Provisional Patent Application No. 61/491,014, filed May 27, 2011, which are hereby incorporated by reference in their entirety.

TECHNICAL FIELD

The present invention relates to image processing and, more particularly, to the encoding and decoding of image and video signals employing metadata, and more particularly, in various layers of metadata.

BACKGROUND

Known scalable video encoding and decoding techniques allow for the expansion or contraction of video quality, depending on the capabilities of the target video display and the quality of the source video data.

Improvements in image and/or video rendering and the experience to the viewers may be made, however, in the use and application of image metadata in either a single level or in various levels of metadata.

SUMMARY

Several embodiments of scalable image processing systems and methods are disclosed herein whereby color management processing of source image data to be displayed on a target display is changed according to varying levels of metadata.

In one embodiment, a method for processing and rendering image data on a target display through a set of levels of metadata is disclosed wherein the metadata is associated with the image content. The method comprises inputting the image data; ascertaining the set of levels of metadata associated with the image data; if no metadata is associated with the image data, performing at least one of a group of image processing steps, said group comprising: switching to default values and adaptively calculating parameter values; if metadata is associated with the image data, calculating color management algorithm parameters according to set of levels of metadata associated with the image data.

In yet another embodiment, a system for decoding and rendering image data on a target display through a set of levels of metadata is disclosed. The system comprises: a video decoder, said video decoder receiving input image data and outputting intermediate image data; a metadata decoder, said metadata decoder receiving input image data wherein said metadata decoder capable of detecting a set of levels of metadata associated with said input image data and outputting intermediate metadata; a color management module, said color management module receiving intermediate metadata from said metadata decoder, receiving intermediate image data from said video decoder, and performing image processing upon intermediate image data based upon said intermediate metadata; and a target display, said target display receiving and displaying the image data from said color management module.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Overview

One aspect of video quality concerns itself with having images or video rendered on a target display with the same or substantially the same fidelity as it was intended by the creator of the images or video. It is desirable to have a Color Management (CM) scheme that tries to maintain the original appearance of video content on displays with differing capabilities. In order to accomplish this task, it might be desirable that such a CM algorithm be able to predict how the video appeared to viewers in the post production environment where it was finalized.

Figure 1A:
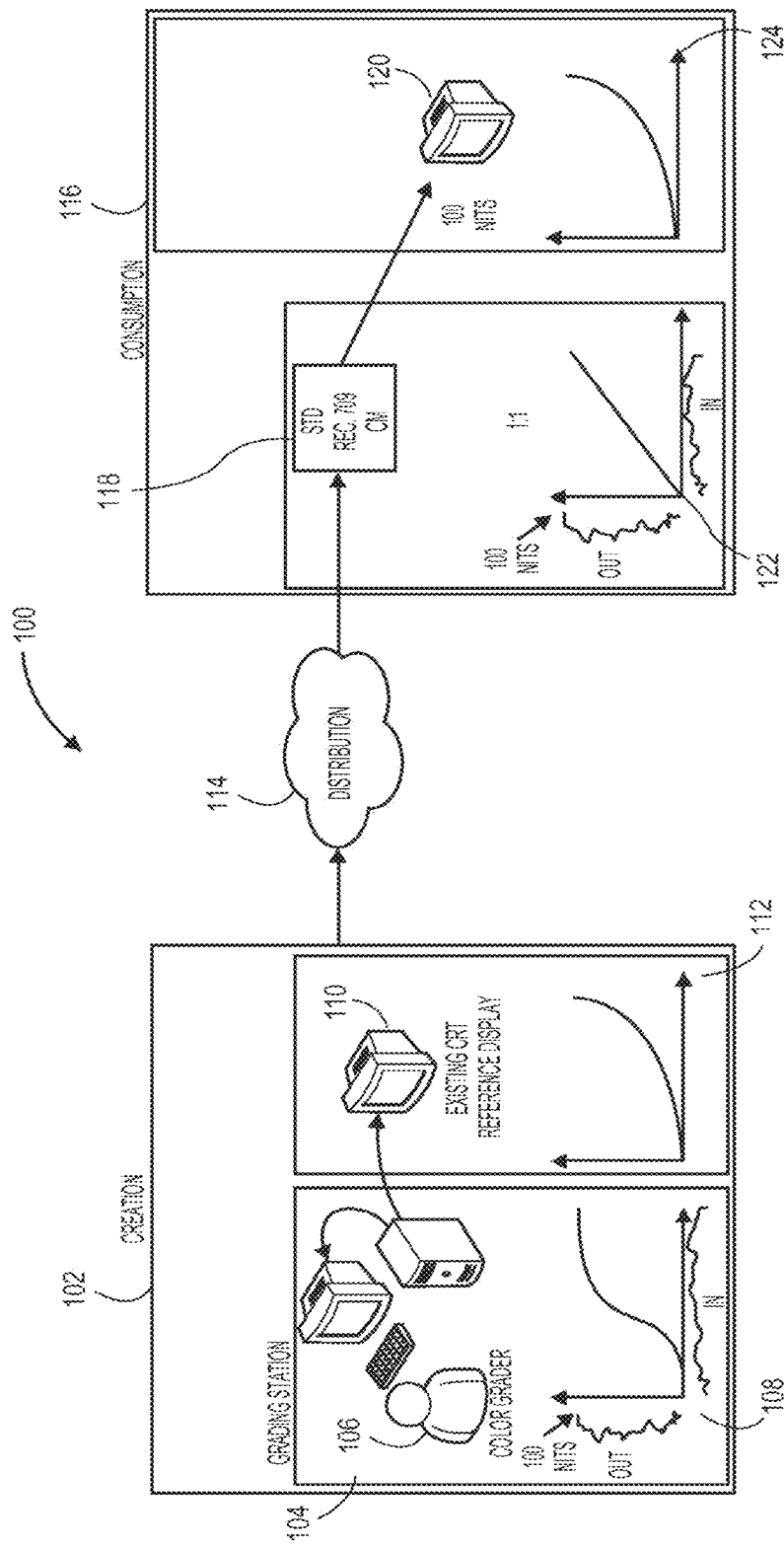
FIGS. 1A, 1B and 1C show one embodiment of a current video pipeline from creation, to distribution, to consumption of a video signal.
Figure 1B:
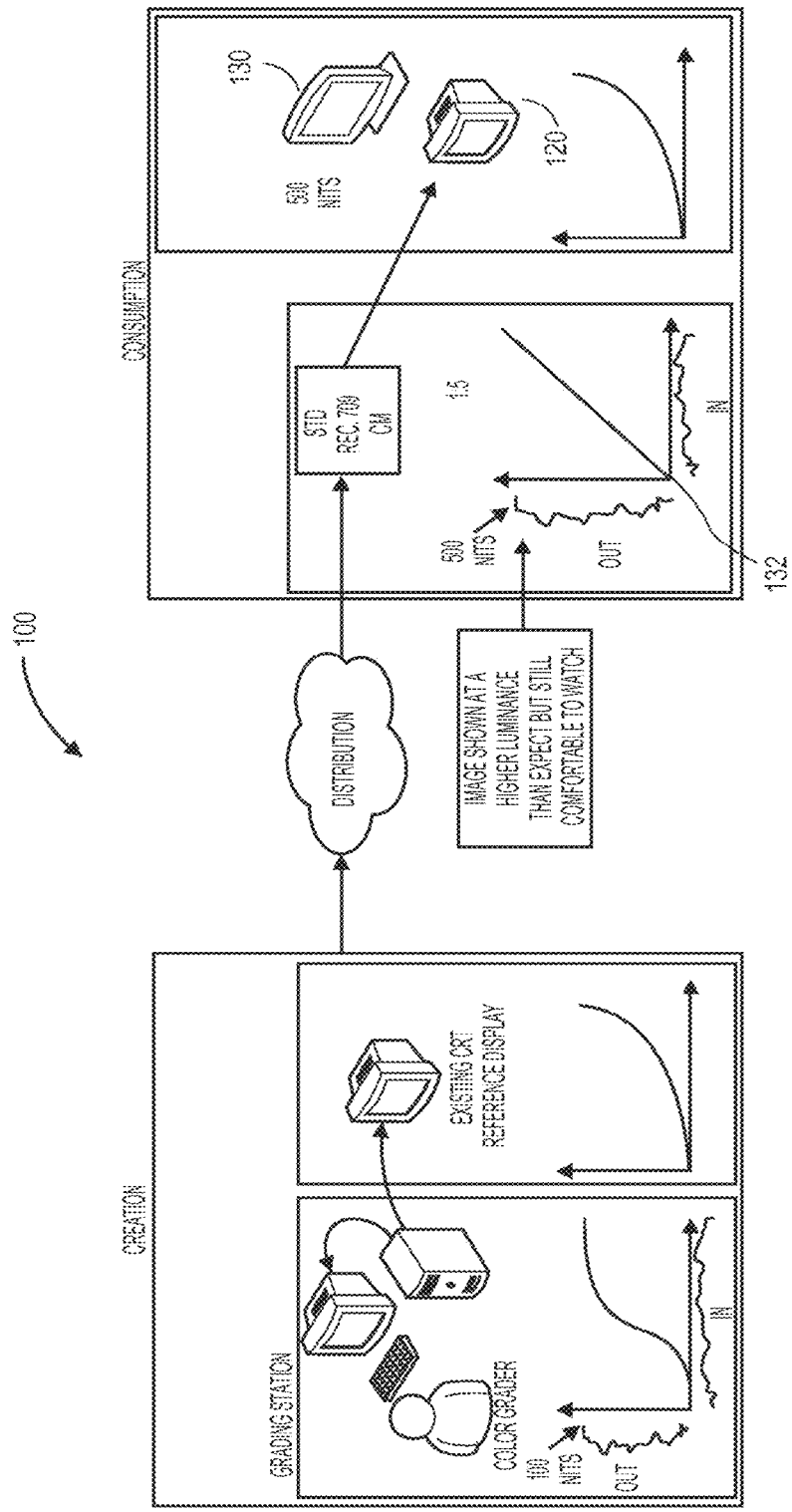
Figure 1C:
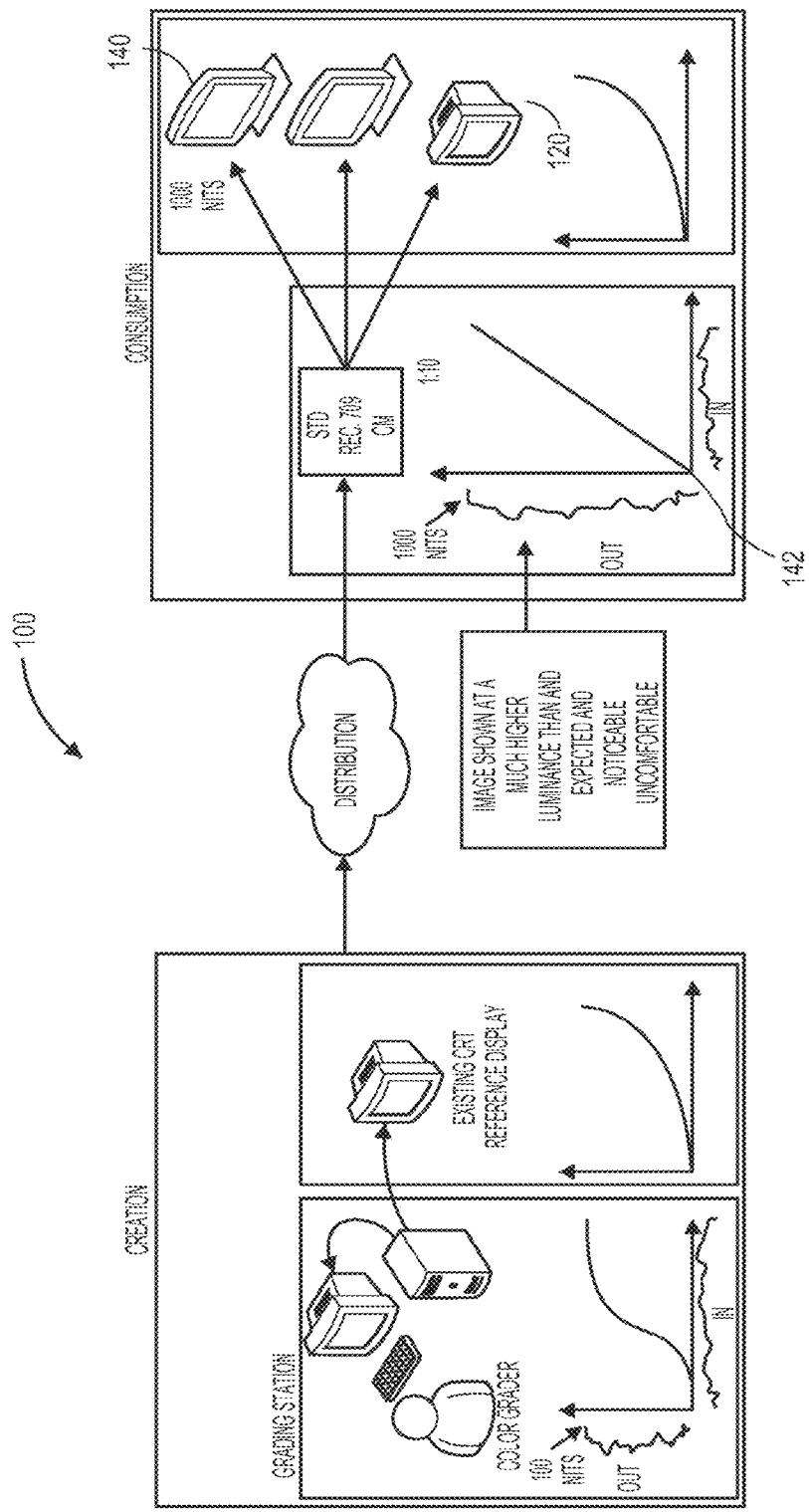

To illustrate the issues germane to the present application and system, FIGS. 1A, 1B and 1C depict one embodiment of a current video pipeline 100 that follows a video signal from creation, to distribution and to consumption of that video signal.

Creation 102 of video signal may occur with the video signal being color graded 104 by a color grader 106 who may grade the signal for various image characteristics—e.g. luminance, contrast, color rendering of an input video signal. Color grader 106 may grade the signal to produce image/video mapping 108 and such grading may be done to a reference display device 110 that may have, for example, a gamma response curve 112.

Once the signal has been graded, the video signal may be sent through a distribution 114—where such distribution should be proper conceived of broadly. For example, distribution could be via the internet, DVD, movie theatre showings and the like. In the present case, the distribution is shown in FIG. 1A as taking the signal to a target display 120 of maximum luminance of 100 nits and having gamma response curve 124. Assuming that the reference display 110 had substantially the same maximum luminance as the target display and substantially the same response curve, then the mapping applied to the video signal may be as simple as a 1:1 mapping 122—and made in accordance with, for example, Rec 709 STD for color management 118. Holding all other factors equal (like for example, ambient light conditions at the target display), then what one might see at the reference display is substantially what you would see at the target display.

This situation may change, for example, as shown in FIG. 1B, wherein the target display 130 differs from the reference display 110 in several aspects—e.g. maximum luminance (500 nits as opposed to 100 nits for the reference display). In this case, the mapping 132 might be a 1:5 mapping to render on the target display. In such a case, the mapping is a linear stretch through the Rec 709 CM block. Any potential distortion from reference display viewing to target display viewing may or may not be objectionable to the viewer, depending on levels of individual discrimination. For example, the darks and mid-tones are stretched but might be acceptable. In addition, it may make MPEG blocking artifacts more significant.

FIG. 1C shows a more extreme example. Here the target display 140 may have more significant differences from the reference display. For example, target display 140 has maximum luminance of 1000 nits—as opposed to 100 nits for the reference display. If the same linear stretch mapping 142 were to be applied to the video signal going to the target display, then much more noticeable, and objectionable, distortions may be present for the viewer. For example, the video content may be displayed at a significantly higher luminance level (1:10 ratio). The darks and mid-tones may be stretched to a point where camera noise of the original capture is noticeable, and banding in the dark areas of the image becomes more significant. In addition, the MPEG blocking artifacts may be more significant.

Without exploring exhaustively all possible examples of how objectionable artifacts may appear to the viewer, it may be instructive to discuss a few more. For example, supposing that the reference display had a larger maximum luminance (say, 600 nits) than the target display (say, 100 nits). In this case, if the mapping is again a 6:1 linear stretch, then the content may be displayed at an overall lower luminance level and the image may appear to be dark and the dark detail of the image may have a noticeable crush.

In yet another example, suppose the reference display has a different in maximum luminance (say 600 nits) to the target display (say 1000 nits). Applying a linear stretch, even though there may be only a small ratio difference (that is, close to 1:2), the magnitude difference in maximum luminance is potentially large and objectionable. Due to the magnitude difference, the image may be far too bright and might be uncomfortable to watch. The mid-tones may be stretched unnaturally and might appear to be washed out. In addition, both camera noise and compression noise may be noticeable and objectionable. In yet another example, suppose the reference display has a color gamut equal to P3 and the target display has a gamut that is smaller than REC. 709. Assume the content was color graded on the reference display but the rendered content has a gamut equivalent to the target display. In this case, mapping the content from the reference display gamut to the target gamut might unnecessarily compress the content and desaturate the appearance.

Without some sort of intelligent (or at least more accurate) model of image rendering on a target display, it is likely that some distortion or objectionable artifacts will be apparent for the viewer of the images/video. In fact, it is likely that what the viewer experiences is not what was intended by the creator of images/video. While the discussion has focused on luminance, it would be appreciated that the same concerns would also apply to color. In fact, if there is a difference in the source display's color space and the target display's color space and that difference is not properly accounted for, then color distortion would be a noticeable artifact as well. The same concept holds for any differences in the ambient environment between the source display and the target display.

Use of Metadata

As these examples set out, it may be desirable to have an understanding as to the nature and capabilities of the reference display, target display and source content in order to create as high a fidelity to the originally intended video as possible. There are other data—that describes aspects, and conveys information, of the raw image data, called "metadata" that is useful in such faithful renderings.

While tone and gamut mappers generally perform adequately for roughly 80-95% of the images processed for a particular display, there are issues using such generic solutions to process the images. Typically, these methods do not guarantee the image displayed on the screen matches the intent of the director or initial creator. It has also been noted that different tone or gamut mappers may work better with different types of images or better preserve the mood of the images. In addition, it is also noted that different tone and gamut mappers may cause clipping and loss of detail or a shift in color or hue.

When tone-mapping a color-graded image-sequence, the color-grading parameters such as the content's minimal black level and maximum white level may be desirable parameters to drive the tone-mapping of color-graded content onto a particular display. The color-grader has already made the content (on a per image, as well as a temporal basis) look the way he/she prefers. When translating it to a different display, it may be desired to preserve the perceived viewing experience of the image sequence. It should be appreciated that with increasing levels of metadata, it may be possible to improve such preservation of the appearance.

For example, assume that a sunrise sequence has been filmed, and color-graded by a professional on a 1000 nit reference display. In this example, the content is to be mapped for display on a 200 nit display. The images before the sun rises may not be using the whole range of the reference display (e.g. 200 nits max). As soon as the sun rises, the image sequence could use the whole 1000 nit range, which is the maximum of the content. Without metadata, many tone-mappers use the maximum value (such as luminance) as a guideline for how to map content. Thus, the tone-curves applied to the pre-sunrise images (a 1:1 mapping) may be different than the tone-curves applied to the post-sunrise images (a 5× tone compression). The resulting images shown on the target display may have the same peak luminance before and after the sunrise, which is a distortion of the creative intent. The artist intended for the image to be darker before the sunrise and brighter during, as it was produced on the reference display. In this scenario, metadata may be defined that fully describes the dynamic range of the scene; and the use of that metadata may ensure that the artistic effect is maintained. It may also be used to minimize luminance temporal issues from scene to scene.

For yet another example, consider the reverse of the above-given situation. Assume that Scene 1 is graded for 350 nits and that Scene 1 is filmed in outdoor natural light. If Scene 2 is filmed in a darkened room, and shown in the same range, then Scene 2 would appear to be too dark. The use of metadata in this case could be used to define the proper tone curve and ensure that Scene 2 is appropriately visible. In yet another example, suppose the reference display has a color gamut equal to P3 and the target display has a gamut that is smaller than REC. 709. Assume the content was color graded on the reference display but the rendered content has a gamut equivalent to the target display. The use of metadata that defines the gamut of the content and the gamut of the source display may enable the mapping to make an intelligent decision and map the content gamut 1:1. This may ensure the content color saturation remains intact.

In certain embodiments of the present system, tone and gamut need not be treated as separate entities or conditions of a set of images/video. "Memory colors" are colors in an image that, even though a viewer may not aware of the initial intent, they will look wrong if adjusted incorrectly. Skin tones, sky, and grass are good examples of a memory color that, when tone mapped, their hue might be changed to look wrong. In one embodiment, the gamut mapper has knowledge of a protected color (as metadata) in an image to ensure its hue is maintained during the tone mapping process. The use of this metadata may define and highlight protected colors in the image to ensure correct handling of memory colors. The ability to define localized tone and gamut mapper parameters is an example of metadata that is not necessarily a mere product of the reference and/or target display parameters.

One Embodiment of a Robust Color Management

In several embodiments of the present application, systems and methods for providing a robust color management scheme is disclosed, whereby several sources of metadata are employed to provide better image/video fidelity that matches the original intent of the content creator. In one embodiment, various sources of metadata may be added to the processing, according the availability of certain metadata, as will be discussed in greater detail herein.

Figure 2A:
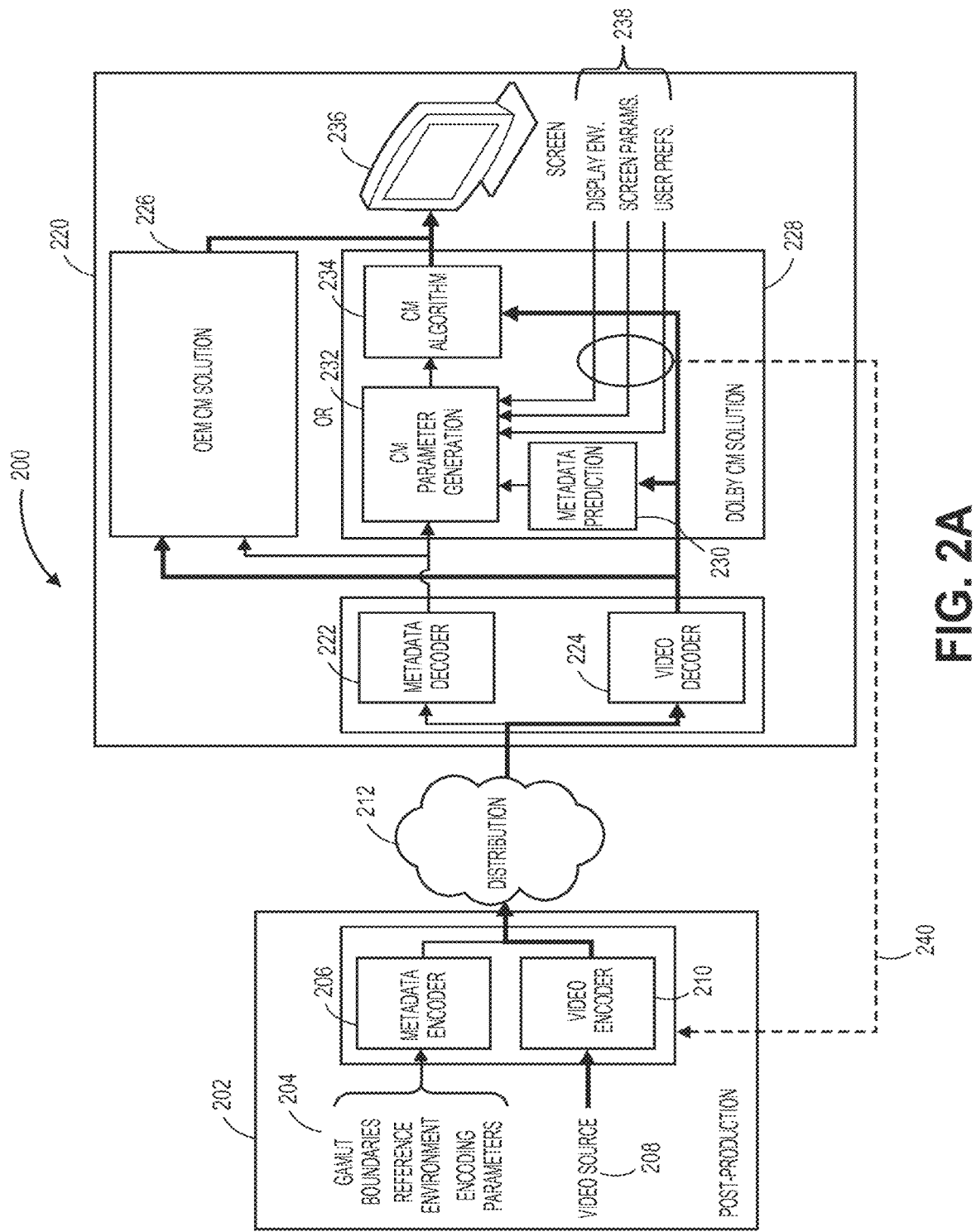
FIG. 2A depicts one embodiment of a video pipeline that comprises a metadata pipeline in accordance with the teachings of the present application.

As merely one exemplary, FIG. 2A shows a high level block diagram of an image/video pipeline 200 that employs metadata. Image creation and post-production may take place in block 202. Video source 208 is input into video encoder 210. Captured as well as video source, metadata 204 is input into a metadata encoder 206. Examples of metadata 204 have been previously discussed; but may include such items as gamut boundaries and other parameters of the source and/or reference display, the environment of the reference display and other encoding parameters. In one embodiment, the metadata accompanies the video signals, as a subset of metadata might be co-located temporally and spatially with the video signals that are intended to be rendered at a given time. Together, metadata encoder 206 and video encoder 210 may be considered the source image encoder.

Video signal and metadata are then distributed via distribution 212—in any suitable manner—e.g. multiplexed, serial, parallel or by some other known scheme. It should be appreciated that distribution 212 should be conceived of broadly for the purposes of the present application. Suitable distribution schemes might include: internet, DVD, cable, satellite, wireless, wired or the like.

Video signals and metadata, thus distributed, are input into a target display environment 220. Metadata and video decoders, 222 and 224 respectively, receive their respective data streams and provide decoding appropriate for the characteristics of the target display, among other factors. Metadata at this point might preferably be sent to either a third party Color Management (CM) block 220 and/or to one of the embodiments of a CM module 228 of the present application. In the case that the video and metadata are processed by CM block 228, CM parameter generator 232 may take as inputs metadata from metadata decoder 222 as well as metadata prediction block 230.

Figure 2B:
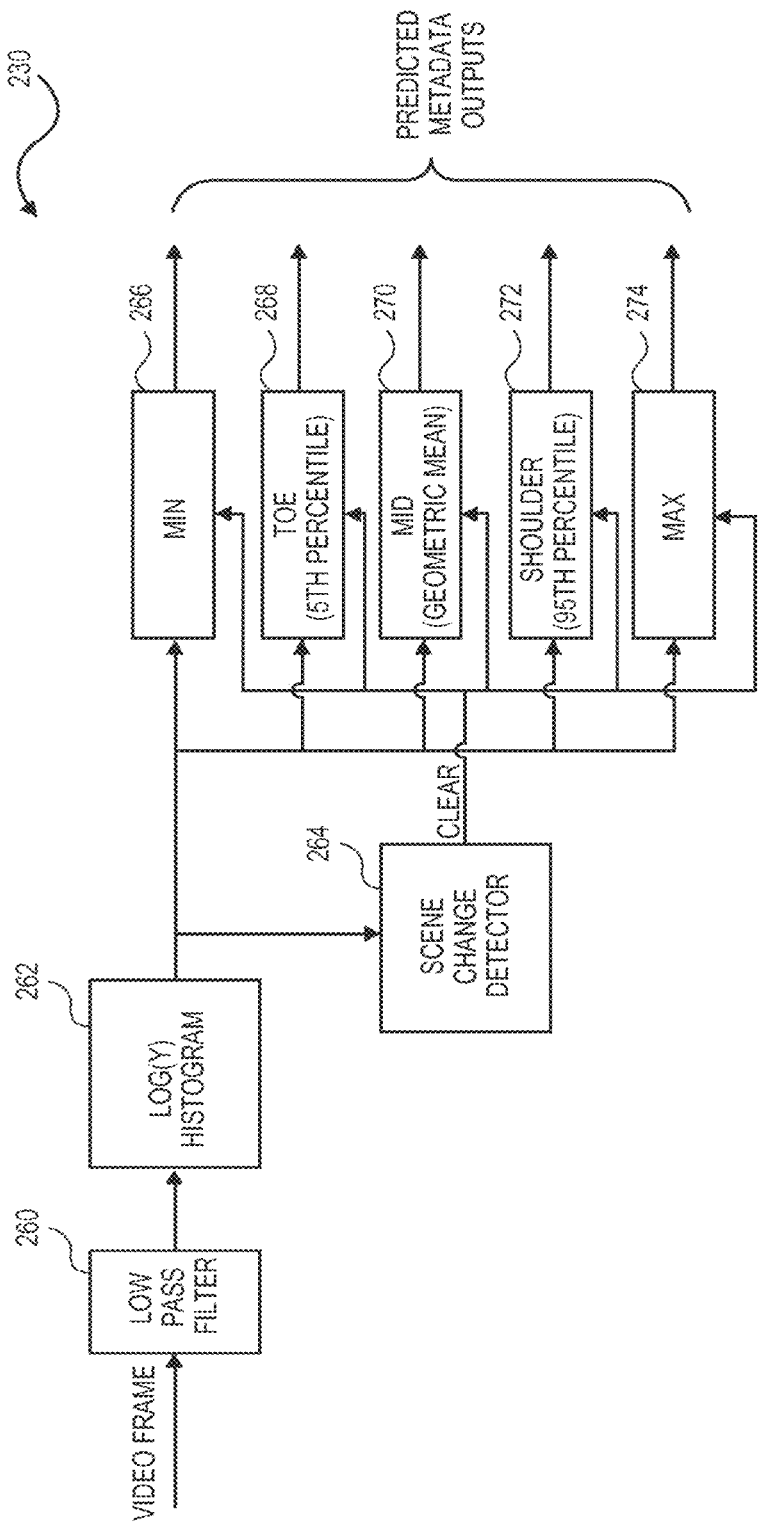
FIG. 2B depicts one embodiment of a metadata prediction block.

Metadata prediction block 230 may make certain predictions of a higher fidelity rendering based upon knowledge of previous images or video scenes. The metadata prediction block gathers statistics from the incoming video stream in order to estimate metadata parameters. One possible embodiment of a metadata prediction block 230 is shown in FIG. 2B. In this embodiment, a histogram 262 of the log of the image luminance may be calculated for each frame. An optional low pass filter 260 may precede the histogram in order to (a) reduce sensitivity of histogram to noise and/or (b) partially account for natural blur in human vision system (e.g. humans perceive a dither pattern as a solid color patch). From that the minimum 266, maximum 274 are captured. The toe 268 and shoulder 272 points can also be captured based on percentile settings (like 5% and 95%). The geometric mean 270 (log average) can also be calculated and used as the mid point. These values may be temporally filtered, so that, e.g., they do not jerk around too quickly. These values may also be reset during a scene change if desired. Scene changes may be detected from black frame insertion or extreme radical jumps in the histogram or any other such technique. It will be appreciated that the scene change detector 264 could detect scene changes from either histogram data, as shown, or from the video data directly.

In yet another embodiment, the system might compute the mean of the image intensity values (luminance). Image intensity may then be scaled by a perceptual weighting, such as log, power function, or a LUT. The system might then estimate the highlight and shadow regions (e.g. headroom and footroom on FIG. 5) from pre-determined percentiles of the image histogram (for example 10% and 90%). Alternatively, the system may estimate the highlight and shadow regions from when the slope of the histogram is above or below a certain threshold. Many variations are possible—for example, the system may calculate the maximum and minimum values of the input image, or from pre-defined percentiles (for example 1% and 99%).

In other embodiments, the values may be stabilized over time (e.g. frame to frame), such as with a fixed rise and fall rate. Sudden changes may be indicative of a scene change, so the values might be exempt from time-stabilization. For example, if the change is below a certain threshold, the system might limit the rate of change, otherwise, go with the new value. Alternatively, the system may reject certain values from influencing the shape of the histogram (such as letterbox, or zero values).

In addition, CM parameter generator 232 could take other metadata (i.e. not necessarily based on content creation) such as display parameters, the ambient display environment and user preferences to factor into the color management of the images/video data. It will be appreciated that display parameters could be made available to CM parameter generator 232 by standard interfaces, e.g. EDID or the like via interfaces (such as DDC serial interfaces, HDMI, DVI or the like). In addition, ambient display environment data may be supplied by ambient light sensors (not shown) that measure the ambient light conditions or reflectance of such from the target display.

Having received any appropriate metadata, CM parameter generator 232 may set parameters in a downstream CM algorithm 234 which may concern itself with the final mapping of image/video data upon the target display 236. It should be appreciated that there does not need to be a bifurcation of functions as shown between CM parameter generator 232 and CM algorithm 234. In fact, in some embodiments, these features may be combined in one block.

Likewise, it will be appreciated the various blocks forming FIGS. 2A and 2B are optional from the standpoint of the present embodiment and that it is possible to design many other embodiments—with or without these recited blocks—that are within the scope of the present application. In addition, CM processing may take place at different points in the image pipeline 200 and not necessarily as depicted in FIG. 2A. For example, CM of the target display may be placed and contained within the target display itself, or such processing may be performed in a set top box. Alternatively, depending on what level of metadata processing is available or deemed appropriate, CM of the target display could take place in the distribution or at the point of post-production.

Scalable Color Management Using Varying Levels of Metadata

In several embodiments of the present application, systems and methods for providing a scalable color management scheme is disclosed, whereby the several sources of metadata may be arranged in a set of varying levels of metadata to provide an even higher level of image/video fidelity to the original intent of the content creator. In one embodiment, various levels of metadata may be added to the processing, according the availability of certain metadata, as will be discussed in greater detail herein.

In many embodiments of the present system, suitable metadata algorithms may consider a plethora of information, such as, for example:
(1) the encoded video content,
(2) a method for converting the encoded content into linear light (3) the gamut boundaries (both luminance and chromaticity) of the source content, and
(4) information on the post-production environment.

The method for converting to linear light may be desirable so that the appearance (luminance, color gamut, etc.) of the actual image observed by the content creators can be calculated. The gamut boundaries aid in specifying in advance what the outer-most colors may be, so that such outer-most colors may be mapped into the target display without clipping or leaving too much overhead. The information on the post production environment may be desirable so that any external factors that that could influence the appearance of the display might be modeled.

In current video distribution mechanisms, only the encoded video content is provided to a target display. It is assumed that the content has been produced in a reference studio environment using reference displays compliant with Rec. 601/709 and various SMPTE standards. The target display system is typically assumed to comply with Rec. 601/709—and the target display environment is largely ignored. Because of the underlying assumption that the post-production display and target display will both comply with Rec.601/709, neither of the displays may be upgraded without introducing some level of image distortion. In fact, as Rec. 601 and Rec. 709 differ slightly in their choice of primaries, some distortion may have already been introduced.

One embodiment of a scalable system of metadata levels is disclosed herein that enables the use of reference and target displays with a wider and enhanced range of capabilities. The various metadata levels enable a CM algorithm to tailor source content for a given target display with increasing levels of accuracy. The following sections describe the levels of metadata proposed:

Level 0

Level 0 metadata is the default case and essentially means zero metadata. Metadata may be absent for a number of reasons including:
(1) Content creators did not include it (or it was lost at some point in the post-production pipeline)
(2) Display switches between content (i.e. channel surfing or commercial break)
(3) Data corruption or loss.

In one embodiment, it may be desirable that CM processing handle Level 0 (i.e. where no metadata is present) either by estimating it based on video analysis or by assuming default values.

In such an embodiment, Color Management algorithms may be able to operate in the absence of metadata in at least two different ways:

Switch to default values

In this case a display would operate much like today's distribution system where the characteristics of the post production reference display are assumed. Depending on the video encoding format, the assumed reference display could potentially be different. For example, a Rec. 601/709 display could be assumed for 8 bit RGB data. If color graded on a professional monitor (such as a ProMonitor) in 600 nit mode, P3 or Rec 709 gamut could be assumed for higher bit depth RGB data or LogYuv encoded data. This might work well if there is only one standard or a de facto standard for higher dynamic range content. However, if the higher dynamic range content is created under custom conditions, the results may not be greatly improved and may be poor.

Adaptively Calculate Parameter Values

In this case, the CM algorithm might start with some default assumptions and refine those assumptions based on information gained from analyzing the source content. Typically, this might involve analyzing the histogram of the video frames to determine how to best adjust the luminance of the incoming source, possibly by calculating parameter values for a CM algorithm. In doing so, there may be a risk in that it may produce an 'auto exposure' type of look to the video where each scene or frame is balanced to the same luminance level. In addition, some formats may present some other challenges—for example, there is currently no automated way to determine the color gamut if the source content is in RGB format.

In another embodiment, it is possible to implement a combination of the two approaches. For example, gamut and encoding parameters (like gamma) could be assumed to be a standardized default value and a histogram could be used to adjust the luminance levels.

Level 1

In the present embodiment, Level 1 metadata provides information describing how the source content was created and packaged. This data may allow CM processing to predict how the video content actually appeared to the content producers. The Level 1 metadata parameters may be grouped into three areas:
 (1) video encoding parameters,
 (2) source display parameters,
 (3) source content gamut parameters, and
 (4) environmental parameters.

Video Encoding Parameters

As most Color Management algorithms work at least partially in a linear light space, it may be desirable to have a method to convert the encoded video to a linear (but relative) (X,Y,Z) representation—either inherent in the encoding scheme or provided as metadata itself. For example, encoding schemes, such as LogYuv, OpenEXR, LogYxy or LogLuv TIFF, inherently contain the information necessary to convert to a linear light format. However, for many RGB or YCbCr formats, additional information such as gamma and color primaries may be desired. As an example, to process YCbCr or RGB input, the following pieces of information may be supplied:
 (1) the coordinates of the primaries and white point used for encoding the source content. This may be used to generate the RGB to XYZ color space transform matrix. (x,y) coordinates for each of red, green, blue, and white.
 (2) the minimum and maximum code values (eg. 'standard' or 'full' range). This may be used to convert code values into normalized input values.
 (3) the global or per-channel response curve for each primary (eg. 'gamma'). This may be used to linearize the intensity values by undoing any non-linear response that may have been applied by the interface or the reference display.

Source Display Gamut Parameters

It may be useful for the Color Management algorithms to know the color gamut of the source display. These values correspond to the capabilities of the reference display used to grade the content. The source display gamut parameters, measured preferably in a completely dark environment, might include:
 (1) Primaries, such as provided as CIE x,y chromaticity coordinates with maximum luminance specified or XYZ.
 (2) Tristimulus value for white and black, such as CIE XYZ.

Source Content Gamut Parameters

It may be useful for the Color Management algorithms to know the bounds of the color gamut used in generating the source content. Typically, these values correspond to the capabilities of the reference display used to grade the content; however, they may be different due to software settings—or if only a subset of the display's capabilities were used. In some cases, the gamut of the source content may not match the gamut of the encoded video data. For example, the video data may be encoded in LogYuv (or the some other encoding) which encompasses the entire visual spectrum. The source gamut parameters might include:
 (1) Primaries, such as provided as CIE x,y chromaticity coordinates with maximum luminance specified or XYZ
 (2) Tristimulus value for white and black, such as CIE XYZ.

Environmental Parameters

In certain circumstances, just knowing the light levels produced by the reference display may not be enough to determine how the source content 'appeared' to viewers in post production. Information regarding the light levels produced by the ambient environment may also be useful. The combination of both display and environmental light is the signal that strikes the human eye and creates an "appearance". It may be desired to preserve this appearance through the video pipeline. The environmental parameters, preferably measured in the normal color grading environment, might include:
 (1) Reference monitor surround color provided as absolute XYZ value. The viewer's level of adaptation to their environment may be estimated using this value.
 (2) Absolute XYZ value for the black level of the reference monitor in the normal color grading environment. The impact of the ambient lighting on the black level might be determined using this value.
 (3) Color temperature of the ambient light provided as absolute XYZ value of white reflective sample on front of screen (like paper). The viewer's white point adaptation may be estimated using this value.

As noted, Level 1 metadata may provide the gamut, encoding and environmental parameters for the source content. This may allow the CM solution to predict how the source content appeared when approved. However, it may not provide much guidance on how to best adjust the colors and luminance to suit the target display.

Figure 3:
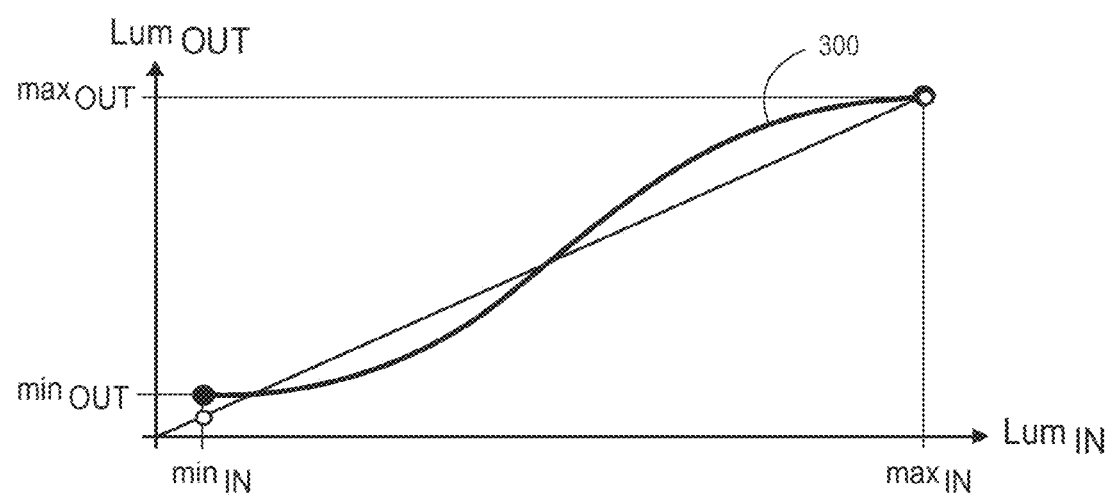
FIG. 3 shows one embodiment of a sigmoidal curve that employs Level 1 metadata.
Figure 4:
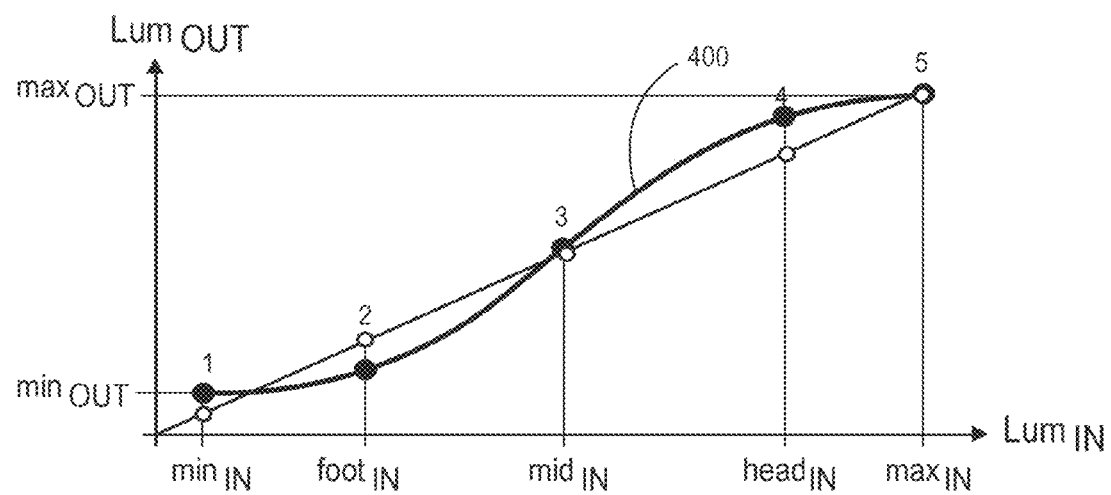
FIG. 4 shows one embodiment of a sigmoidal curve that employs Level 2 metadata.
Figure 6:
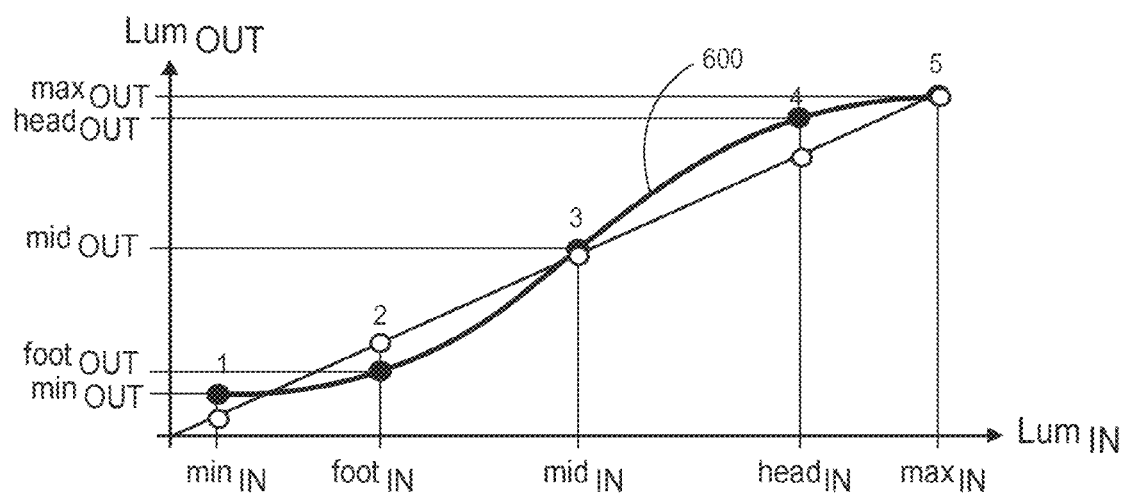
FIG. 6 shows one embodiment of an adjusted image/video mapping based on Level 3 metadata that includes a second reference display grading of the image/video data.

In one embodiment, a single sigmoidal curve applied globally to video frames in RGB space may be a simple and stable way of mapping between different source and target dynamic ranges. Additionally, a single sigmoidal curve may be used to modify each channel (R, G, B) independently. Such a curve might also be sigmoidal in some perceptual space, such as log or power functions. An example curve 300 is shown in FIG. 3. It will be appreciated that other mapping curves would also be suitable, such as a linear map (as shown in FIGS. 3, 4 and 6), or other maps, such as gamma.

In this case, the minimum and maximum points on the curve are known from the Level 1 metadata and information on the target display. The exact shape of the curve could be static and one that has been found to work well on average based on the input and output range. It could also be modified adaptively based on the source content.

Level 2

Level 2 metadata provides additional information about the characteristics of the source video content. In one embodiment, Level 2 metadata may divide the luminance range of the source content into specific luminance regions. More specifically, one embodiment might break the luminance range of the source content into five regions, where the regions may be defined by points along the luminance range. Such ranges and regions may be defined by one image, a set of images, one video scene or a plurality of video scenes.

Figure 5:
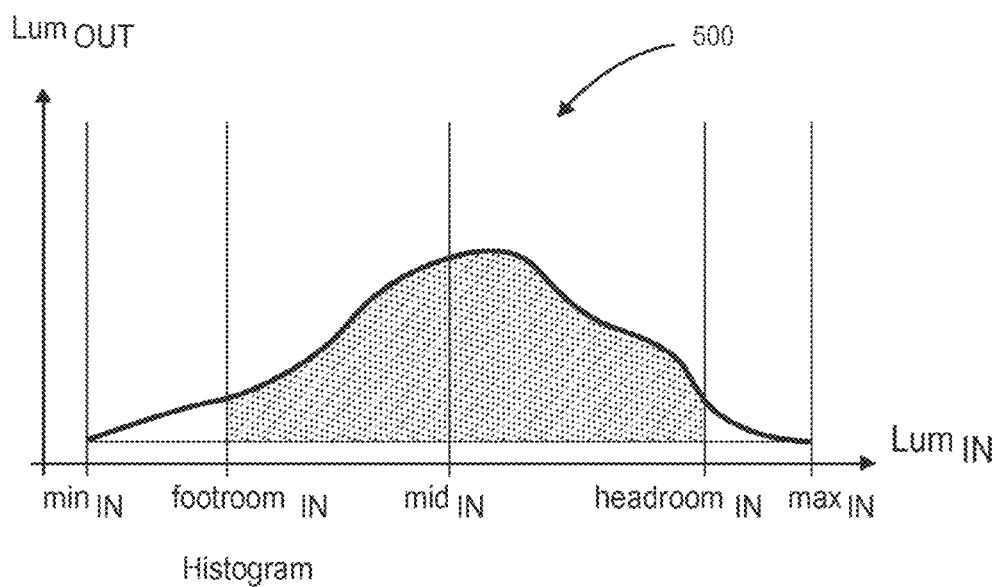
FIG. 5 shows one embodiment of a histogram plot based on image/scene analysis that may be used to adjust the image/video mapping onto a target display.

For the sake of exposition, FIGS. 4 and 5 depict one embodiment of the use of Level 2 metadata. FIG. 4 is a mapping 400 of input luminance to output luminance on the target display. Mapping 400 is depicted here as a substantially sigmoidal curve comprising a set of break points along its curve. These points may correspond to image processing relevant values—labeled there as: $min_{in}$, $foot_{in}$, $mid_{in}$, $head_{in}$ and $max_{in}$.

In this embodiment, $min_{in}$ and $max_{in}$ may correspond to the minimum and maximum luminance values for a scene. The third point, $mid_{in}$, may be the middle value which corresponds to a perceptually 'average' luminance value or 'middle grey'. The final two points, $foot_{in}$ and $head_{in}$, may be the footroom and headroom values. The region between the footroom and headroom values may define an important portion of the scene's dynamic range. It may be desirable that content between these points should be preserved as much as possible. Content below the footroom may be crushed if desired. Content above the headroom corresponds to highlights and may be clipped if desired. It should be appreciated that these points tend to define a curve itself, so another embodiment might be a best fit curve to these points. Additionally, such a curve might assume linear, gamma, sigmoidal or any other suitable and/or desirable shape.

Further to this embodiment, FIG. 5 illustrates the minimum, footroom, middle, headroom and maximum points as shown on a histogram plot 500. Such a histogram may be produced on an image basis, video scene basis or even a set of video scene basis, depending on which level of granularity of the histogram analysis is desired to help preserve content fidelity. In one embodiment, the five points may be specified in code values, in the same encoding representation as the video data. Note that the min and max may typically correspond to the same values as the range of the video signal, but not always.

Depending on the granularity and frequency of such histogram plots, the histogram analysis may be used to redefine points along the luminance map of FIG. 4 on a dynamic basis—and hence alter the curve over time. This may also be helpful to improve content fidelity as displayed to the viewer on a target display. For example, in one embodiment, passing the histogram along periodically allows the decoder to potentially derive more information than just the min, max, etc. The encoder might also only include a new histogram when there was a significant change. This might save the decoder the effort of calculating it for each frame on the fly. In yet another embodiment, the histogram might be used to estimate metadata—to either replace missing metadata or to supplement existing metadata.

Level 3

In one embodiment, for level 3 metadata, the Level 1 and Level 2 metadata parameters may be employed for a second reference grading of the source content. For example, the primary grade of the source content may have been performed on a reference monitor (e.g. ProMonitor) using a P3 gamut at 600 nits luminance. With Level 3 metadata, information on a secondary grading might be performed, for example, on a CRT reference could be provided as well. In this case, the additional information would indicate Rec.601 or Rec.709 primaries and a lower luminance like 120 nits. The corresponding min, foot, mid, head, and max levels would also be provided to the CM algorithm.

Level 3 metadata may add additional data—e.g. gamut, environment, primaries, etc. and luminance level information for a second reference grading of the source content. This additional information may then be combined to define a sigmoidal curve 600 (as shown in FIG. 6) that will map the primary input to the range of the reference display. FIG. 6 shows an example of how the input and reference display (output) levels can be combined to form a suitable mapping curve.

Figure 7:
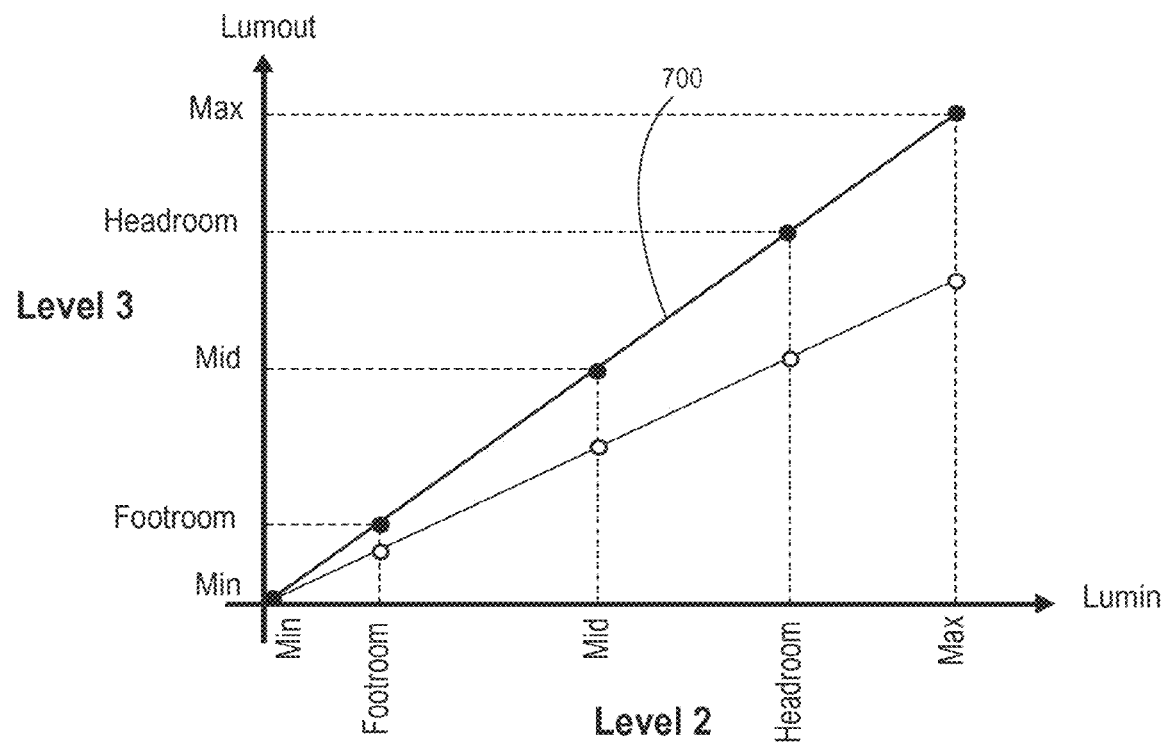
FIG. 7 shows one embodiment of a linear mapping that might occur if the target display is a substantially good match to the second reference display used to color grade the image/video data.

If the target display's capabilities are a good match for the secondary reference display then this curve can be used directly for mapping the primary source content. However, if the target display's capabilities sit somewhere between that of the primary and secondary reference display, then the mapping curve for the secondary display can be used as a lower bound. The curve used for actual target display can then be an interpolation between no reduction (e.g. a linear mapping 700 as shown in FIG. 7) and the full range reduction curve generated using the reference levels.

Level 4

Level 4 metadata is the same as Level 3 metadata except that the metadata for the second reference grading is tailored to the actual target display.

Level 4 metadata could also be implemented in an over-the-top (OTT) scenario (i.e. Netflix, mobile streaming or some other VOD service) where the actual target display sends its characteristics to the content provider and the content is distributed with most suitable curves available. In one such embodiment, the target display may be in communication with the video streaming service, VOD service or the like, and the target display may sent to the streaming service information, such as its EDID data or any other suitable metadata available. Such communication path is depicted as the dotted line path 240 in FIG. 2A, to either video and/or the metadata encoder (210 and 206 respectively)—as is known in the art with services like Netflix and the like. Typically, Netflix and other such VOD services are monitoring the amount of data and speed of data throughput to the target device—and not necessarily metadata for color management purposes. It is sufficient for the purposes of this present embodiment, though, that metadata be sent from the target data to the creation or post-production—either through the distribution 212 or otherwise (in realtime or a priori)—to change the color, tone or other characteristics of the image data to be delivered to the target display.

With Level 4 metadata the reference luminance levels provided are specifically for the target display. In this case, a sigmoidal curve could be constructed as shown in FIG. 6 and used directly without any interpolation or adjustment.

Level 5

Level 5 metadata enhances Level 3 or Level 4 with identification of salient features such as the following:
(1) Protected colors—colors in the image that have been identified as common memory colors that should not be processed such as skin tones, color of the sky, grass, etc. Such regions of an image having protected colors may have their image data passed onto the target display without alteration.
(2) Salient highlights—identify light sources, maximum emissive and specular highlights
(3) Out of gamut color—features in the image that have been purposely color graded outside the gamut of the source content.

In some embodiments, if the target display is capable of higher luminance, these identify objects could be artificial mapped to the maximum of the display. If the target display is capable of lower luminance, these objects could be clipped to the display maximum while not compensating for detail. These object might then be ignored and the mapping curve defined might be applied to the remaining content and maintain higher amounts of detail.

It should be also appreciated that, in some embodiments, e.g. in the case of trying to map VDR down to a lower dynamic range display, it may be useful to know the light sources and highlights because one might clip them without doing too much harm. For one example, a brightly lit face on the other hand (i.e. definitely not a light source) may not be a feature that it is desirable to clip. Alternatively, such a feature might be compressed more gradually. In yet another embodiment, if the target display is capable of a wider gamut, these content object may be expanded and to the full capabilities of the display. Additionally, in another embodiment, the system might ignore any mapping curve defined to ensure a highly saturated color.

It should be appreciated that in several embodiments of the present application, the levels themselves may not be a strict hierarchy of metadata processing. For example, Level 5 could apply to either Level 3 or Level 4 data. In addition, some lower numbered levels may not be present; yet the system may process higher numbered levels, if present.

One Embodiment of a System Employing Multiple Metadata Levels

Figure 8:
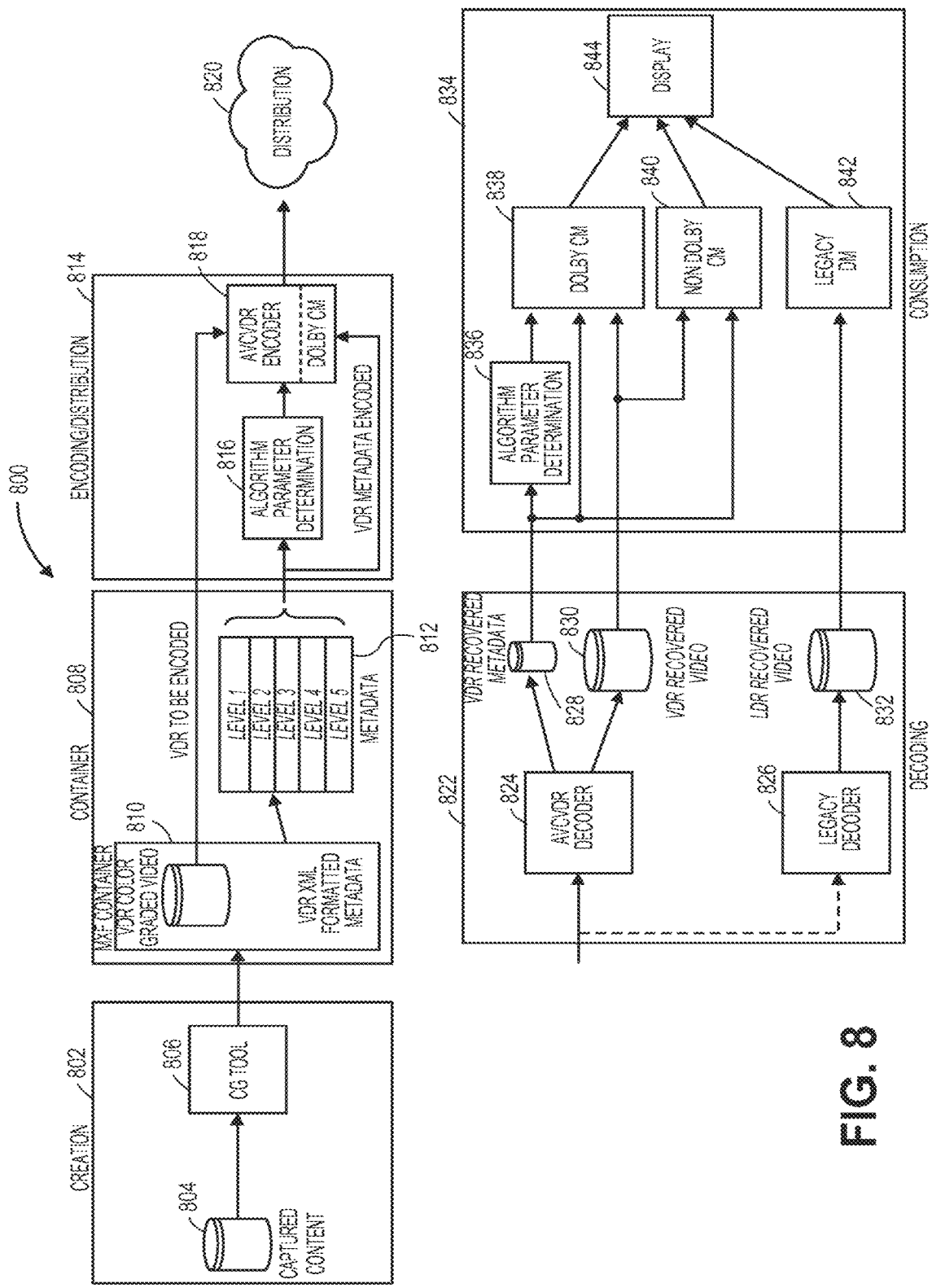
FIG. 8 is one embodiment of a video/metadata pipeline, made in accordance with the principles of the present application.

As discussed above, the varying metadata levels provide increasing information about the source material that allows a CM algorithm to provide increasingly accurate mappings for a target display. One embodiment that employs such scalable and varying levels of metadata is shown in FIG. 8.

System 800, as depicted, shows an entire video/metadata pipeline through five blocks—creation 802, container 808, encoding/distribution 814, decoding 822 and consumption 834. It will be appreciated that many variations of different implementations are possible—some having more blocks and some less blocks. The scope of the present application should not be limited to the recitation of the embodiments herein and, in fact, the scope of the present application encompasses these various implementations and embodiments.

Creation 802 broadly takes image/video content 804 and processes it, as previously discussed, through a color grading tool 806. Processed video and metadata is placed in a suitable container 810—e.g. any suitable format or data structure that is known in the art for subsequent dissemination. For one example, video may be stored and sent as VDR color graded video and metadata as VDR XML formatted metadata. This metadata, as shown in 812, is partitioned in the various Levels previously discussed. In the container block, it is possible to embed data into the formatted metadata that encodes to which levels of metadata are available and associated with the image/video data. It should be appreciated that not all levels of metadata need to be associated with the image/video data; but that whatever metadata and level is associated, the decoding and rendering downstream may be able to ascertain and process such available metadata appropriately.

Encoding may proceed by taking the metadata and providing it to algorithm parameter determination block 816, while the video may be provided to AVCVDR encoder 818—which may also comprise CM block for processing video prior to distribution 820.

Once distributed (as thought broadly via, e.g. internet, DVD, cable, satellite, wireless, wired or the like), decoding of the video/metadata data may proceed to AVCVDR decoder 824 (or optionally to a legacy decoder 826, if the target display is not VDR enabled). Both video data and metadata are recovered from decoding (as block 830, 828 respectively—and possibly 832, if target display is legacy). Decoder 824 may take input image/video data and recover and/or split out the input image data into an image/video data stream to be further processed and rendered, and a metadata stream for calculating parameters for later CM algorithm processing on the image/video data stream to be rendered. The metadata stream should also contain information as whether there is any metadata associated with the image/video data stream. If no metadata is associated, then the system may proceed with Level 0 processing as discussed above. Otherwise, the system may proceed with further processing according to whatever metadata is associated with the image/video data stream, as discussed above according to a set of varying levels of metadata.

It will be appreciated that whether there is or is not any metadata associated with the image/video data to be rendered may be determined in real-time. For example, it may be possible that for some sections of a video stream that no metadata is associated with those section (whether through data corruption or that the content creator intended that there be no metadata)—and in other sections there may be metadata, perhaps a rich set of metadata with varying levels, are now available and associated with other sections of the video stream. This may be intentional on the part of the content creator; but at least one embodiment of the present application should be able to make such determinations as to whether any, or what level, of metadata is associated with the video stream on a real-time or substantially dynamic basis.

In the consumption block, algorithm parameter determination block 836 can either recover the previous parameters perhaps done prior to distribution or may recalculate parameters based on metadata from the target display and/or target environment (perhaps from standard interfaces, e.g. EDID or emerging VDR interfaces as well as input from the viewer or sensors in the target environment—as discussed previously in the context of the embodiment of FIGS. 2A and/or 2B). Once the parameters have been calculated or recovered, they may be send to one or more of the CM systems (838, 840 and/or 840) for final mapping of source and intermediate image/video data onto the target display 844 in accordance with the several embodiments disclosed herein.

In other embodiments, the implementation blocks of FIG. 8 need not finely divided. For example, and broadly speaking, the processing involving the algorithm parameter determination and the color management algorithm itself need not necessarily be bifurcated as shown in FIG. 8; but may be conceived of, and/or implemented as, a color management module.

In addition, while it has been described herein a set of varying levels of metadata for use by a video/image pipeline, it should be appreciated that, in practice, the system does not need to process the image/video data in exacting order as the Levels of metadata are numbered. In fact, it may be the case that some levels of metadata are available at the time of rendering, and other levels not available. For example, a second reference color grading may or may not be performed and that Level 3 metadata may or may not be present at the time of rendering. A system made in accordance with the present application takes the presence or absence of the different levels of metadata into consideration and continues with the best metadata processing as is possible at the time.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A method, comprising
receiving source video signals to generate coded image data;
generating output metadata associated with the coded image data;
generating a bitstream comprising the coded image data and the output metadata, wherein the output metadata comprise a first set of metadata and a second set of metadata, wherein:
the first set of metadata is associated with a portion of the image data and comprises one or more parameters representing characteristics of a reference display device that is used during creation of the image data to color grade the video signals, the parameters including:
a. a white point for the reference display,
b. three primaries for the reference display, and
c. at least one luminance level for the reference display; and
the second set of metadata is associated with the same portion of the image data and includes at least a maximum luminance level for the image data.

2. The method of claim 1, wherein the first set of metadata and the second set of metadata are separately partitioned in the bitstream.

3. The method of claim 1, further comprising distributing the bitstream.

* * * * *